United States Patent [19]
Lampart

[11] Patent Number: 5,655,845
[45] Date of Patent: Aug. 12, 1997

[54] BEARING HOUSING SEAL

[75] Inventor: Karl D. Lampart, Kempton, Pa.

[73] Assignee: SKF USA Inc., King of Prussia, Pa.

[21] Appl. No.: 533,988

[22] Filed: Sep. 27, 1995

[51] Int. Cl.⁶ .................. F16C 33/80; F16C 33/78
[52] U.S. Cl. ................... 384/480; 384/484; 384/489
[58] Field of Search ........................... 384/477, 480, 384/481, 482, 484, 487, 489

[56] References Cited

U.S. PATENT DOCUMENTS

| | | | |
|---|---|---|---|
| 2,891,827 | 6/1959 | Butkus | 384/484 X |
| 3,128,104 | 4/1964 | Teske | 277/42 |
| 3,656,824 | 4/1972 | Ullberg | 384/482 |
| 3,679,277 | 7/1972 | Dohmen | 384/480 |
| 4,348,067 | 9/1982 | Tooley | 384/480 |
| 4,630,458 | 12/1986 | Kakabaker | 384/480 X |
| 4,881,829 | 11/1989 | Koelsch | 384/480 X |
| 4,972,939 | 11/1990 | Uttke et al. | 384/480 X |
| 5,259,628 | 11/1993 | Nisley | 384/482 X |

Primary Examiner—Thomas R. Hannon
Attorney, Agent, or Firm—Eugene E. Renz, Jr.

[57] ABSTRACT

A pillow block assembly comprising a hollow housing having axially spaced end walls, an opening in at least one end wall for a rotable shaft member, a bearing in the housing to rotatably support the shaft member in the housing and a seal in the wall of the housing defining said opening including a labyrinth seal member mounted on the shaft, and first and second resilient sealing members disposed between the labyrinth seal member and the housings and between the shaft and the labyrinth seal member, respectively.

9 Claims, 2 Drawing Sheets

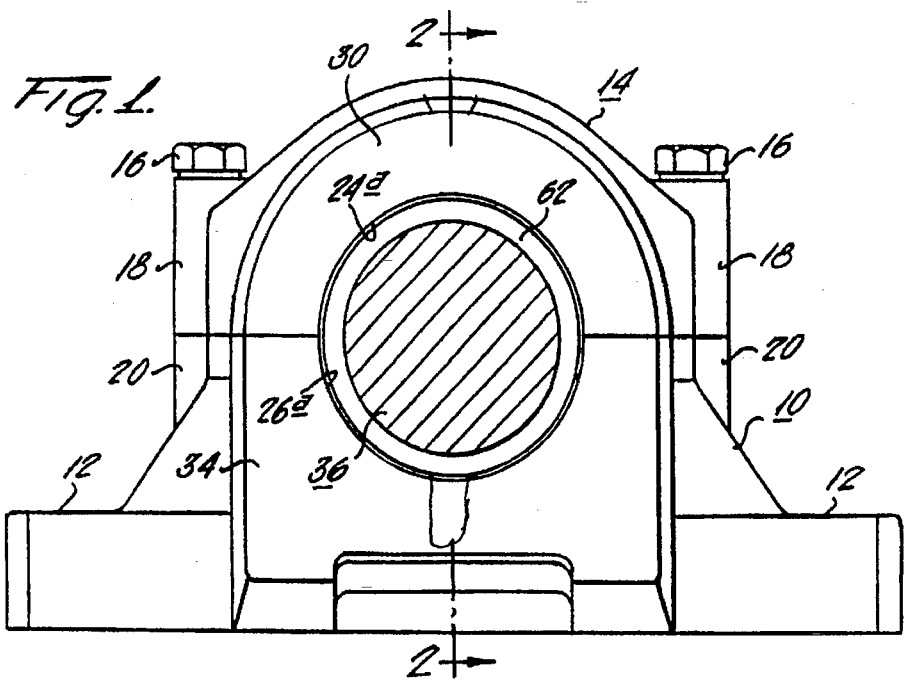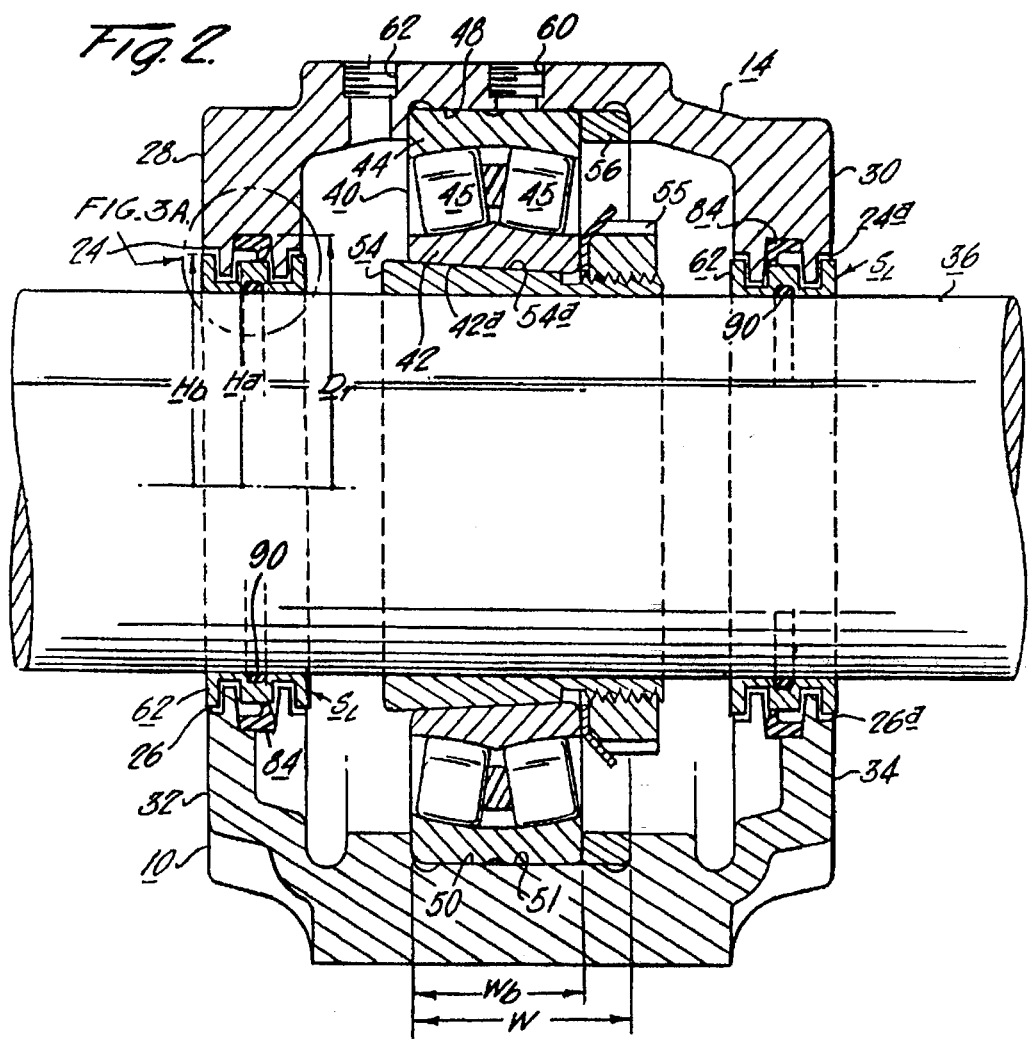

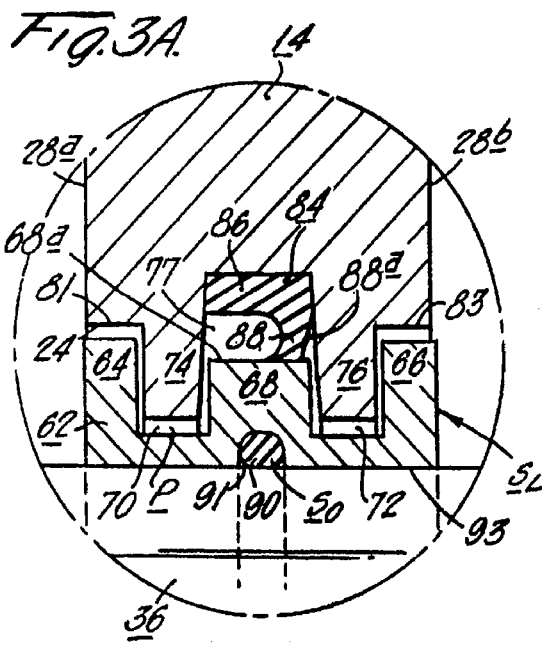
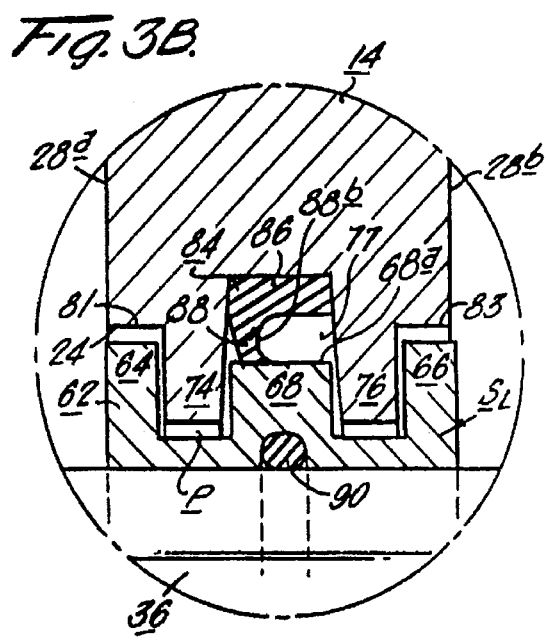
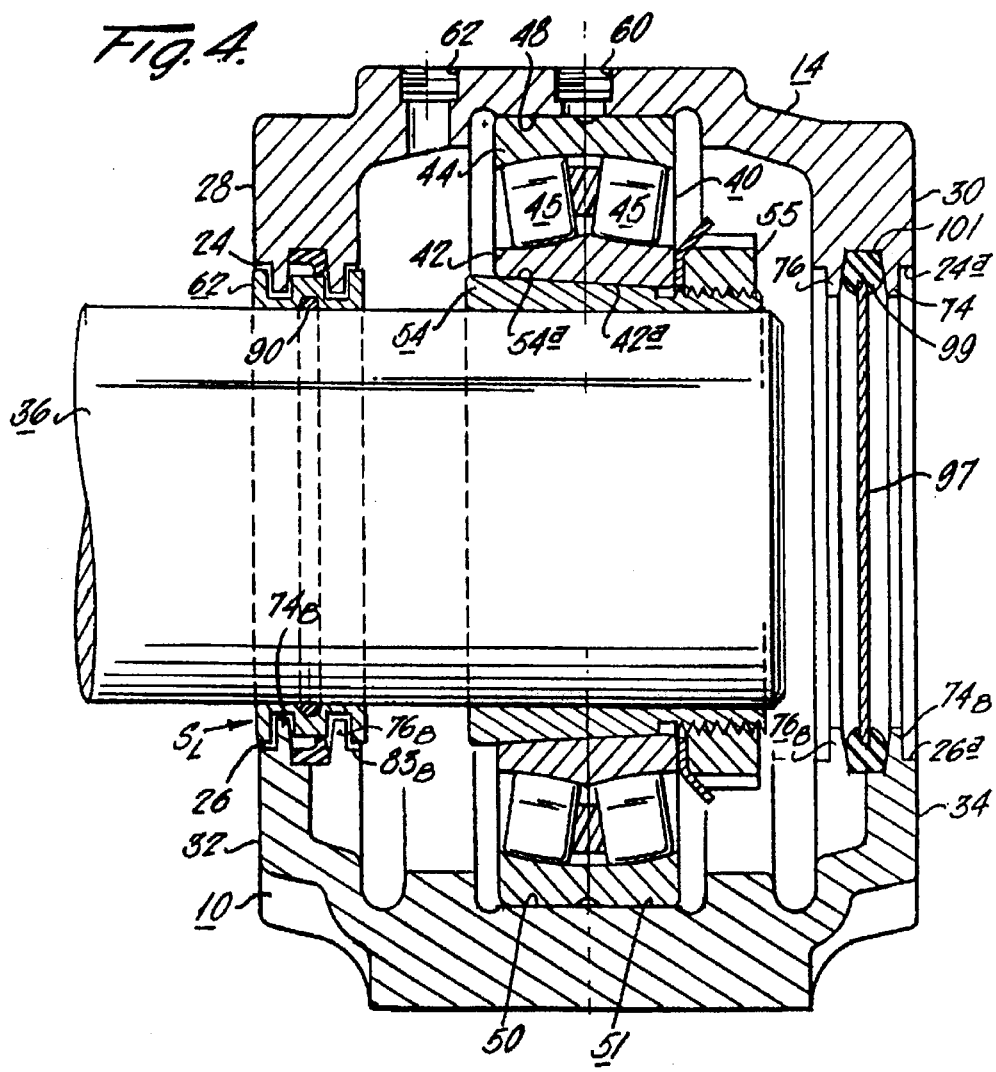

BEARING HOUSING SEAL

FIELD OF THE INVENTION

The present invention relates to improvements in pillow block assemblies and more specifically to a novel seal arrangement for such assemblies.

BACKGROUND OF THE INVENTION

Pillow blocks are not new per se and the prior art discloses a variety of sealing arrangements for pillow blocks. For example, the KOELSCH U.S. Pat. No. 4,881,829, shows a pillow block assembly including a seal chamber located outside the pillow block housing. More specifically, the open end of the housing (10) mounts a triple labyrinth seal (29) and a cartridge seal ring (35) is mounted in a chamber assembly (34) adjacent to the labyrinth seal. Lubricating fluid may be pumped into and out of the sealing chamber (34). The roller bearing assembly (25) is lubricated by grease supplied through a port (32) which connects to a passage (33) leading to the interior of the housing. The grease fills the housing cavity up to the labyrinth seal (29).

Thus the KOELSCH sealing arrangement is rather complex and comprised of many components. A drawback in the KOELSCH arrangement is the complexity and expense of the KOELSCH seal. Further, the KOELSCH seal is non-purgeable, which may cause a problem if the housing is overfilled with grease. Additionally, in some applications which produce thermal shaft expansion in the axial direction, it has been found that the contacting surfaces in the KOELSCH seal tend to separate and consequently there is a loss of sealing function. Moreover, by reason of the additional seal housing, the combined pillow block and seal housing require a considerable axial width which limits use of a pillow block and sealing arrangement of this type in applications where space requirements are tight.

TESKE U.S. Pat. No. 3,128,104 shows a labyrinth seal for shafts comprising a ring magnet (16) bonded to a flexible corrugated membrane (17) adhesively bonded to a flexible corrugated membrane (17) formed with a solid foot portion (18). The assembly further includes a supplementary labyrinth seal comprising disks (31) and (32).

Accordingly, the TESKE seal assembly relies on metal to metal contact and by reason of its construction and configuration cannot be used in applications where there is some amount of axial shaft expansion since shaft expansion would effectively create forces disassembling the seal. Note that in FIG. 5 of TESKE, the two rings have to be moved axially relative to one another to assemble the seal. The TESKE seal assembly requires press fits and ground surfaces to properly mount the seal to the shaft housing assembly. Further, TESKE '104 patent may be broadly described as a magnetic seal and therefore there is no pumping action associated with the seal. TESKE does not incorporate a directional aspect whereby, lubricant can flow in one direction to purge it and the seal has lubricant retention capabilities in its normal operating position. Furthermore, the TESKE seal is not purgeable.

TOOLY, U.S. Pat. No. 4,348,067, shows a pillow block housing and a seal comprising an axial face riding v-ring seal (56) which utilizes axial contact lip pressure to provide a seal at both ends of the housing. This lip seal is located externally of the housing and is therefore exposed and in this condition can be easily damaged, for example, by ultraviolet degradation or contaminants. Furthermore, the TOOLY design is not readily reversible without additional machining of the pillow block housing and requires the inclusion of additional elements, such as a washer or use of special tools to prevent the seal lip from folding under the labyrinth during assembly of the housing cap.

SUMMARY OF THE INVENTION

With foregoing in mind, it is an object of the present invention to provide a pillow block—seal assembly characterized by novel features of construction and arrangement, providing certain functional advantages over the prior art discussed above. To this end, the seal of the present invention is completely contained within the pillow block housing and includes a triple ring seal incorporating an O-ring seal between the triple ring seal and shaft and a radial lip contact seal located in a circumferentially extending chamber between the triple ring seal and pillow block housing wall which is shaped to form a labyrinth with the triple ring seal.

This construction provides a number of functional advantages. For example, existing pillow block assemblies can easily be retrofitted to incorporate the novel sealing arrangement of the present invention. Further, in an assembly utilizing a seal in accordance with the present invention, the O-ring not only prevents passage of contaminants or lubricant under the ring seal, it additionally forces the ring seal to rotate at the shaft speed and consequently eliminates shaft wear and seal rubbing. The base ring seal acts as an inner and outer flinger.

The seal assembly of the present invention is relatively inexpensive comprised of only few parts and the width of the overall assembly is not extended beyond the dimensions of the pillow block by auxiliary sealing housings or the like. Thus it can be used in applications where space considerations dictate compactness.

Further, it is relatively easy and quick to assemble the seal assembly and no adjustment is required due to the fact that the shaft expansion takes place past the O-ring. The seal chamber protects the seal elements from relatively large sharp objects which have the capability of shredding the seal or ultraviolet degradation of the rubber characteristic of some prior seals discussed above, such as, the seal shown in the TOOLY '067 patent. The configuration of the seal provides good misalignment capabilities. The seal of the present invention offers interchangeability between grease and other lubricants. In one configuration, the grease is purgeable and in another the seal can easily be reversed for lubricant retention when the application so requires.

With the foregoing in mind, an object of the present invention is to provide a labyrinth seal arrangement particularly adapted for pillow blocks characterized by novel features of construction and arrangement which can be readily adapted to retrofit existing conventional standard pillow block assemblies.

Another object of the present invention is to provide a novel seal arrangement which minimizes shaft wear.

Still another object of the present invention is to provide a novel seal arrangement particularly adapted for use in pillow block applications wherein the overall width of the assembly is maintained at a minimum thereby facilitating use of a pillow block in applications where conventional extended seal assemblies cannot be used because of their bulk.

Still a further object of the present invention is to provide a novel seal arrangement for pillow blocks which is comprised of relatively few parts and is so that the manufacture and assembly thereof is relatively simple and inexpensive.

A still further object of the present invention is to provide a novel seal assembly which is completely housed within the pillow block housing so that the sealing elements are protected from external elements that can cause damage, such as relatively large sharp objects and particles and ultra violet rays.

Still another object of the present invention is to provide a novel seal arrangement for pillow blocks which allows for slight misalignment of the various elements comprising the pillow block and mounting assembly.

A still further object of the present invention is to provide a novel seal assembly for pillow block assemblies wherein the parts are interchangeable so they can be used in grease lubricant applications and provides a means for purging and by a simple reversal of one of the elements can be adapted for lubricant retention where a lubricant fluid is the lubricant choice.

BRIEF DESCRIPTION OF THE DRAWINGS

These and other objects of the present invention of the various details of the operation and construction thereof or hereinafter more fully set forth with reference to the accompanying drawing, wherein;

FIG. 1 A front elevational view of a pillow block assembly incorporating a novel seal arrangement in accordance with the present invention;

FIG. 2 A sectional elevational view taken on lines 2—2 of FIG. 1;

FIG. 3a An enlarged fragmentary sectional view of the detail and designated FIG. 3a encircled by the broken line circle in FIG. 2;

FIG. 3b Similar to FIG. 3a with the lip of the sealing ring reversed;

FIG. 4 A sectional view similar to FIG. 2 showing a modified pillow block and seal assembly in accordance with the present invention.

DETAILED DESCRIPTION OF THE PREFERRED EMBODIMENT

Referring now to the drawings and particularly to FIGS. 1 and 2 thereof, there is shown a pillow block housing incorporating novel seal means in accordance with the present invention. The assembly comprises a housing base (10) having a laterally extending mounting flange (12) for mounting the pillow block housing on a machine component or the like. The assembly further includes a housing cap portion (14) which seats on the base (10). The cap portion (14) and base (10) are secured in the assembled relationship by elongated bolts (16) which engage through bosses (18) on opposite sides of the cap portion (14) which align with tapped openings in bosses (20) formed integrally with the base (10).

The housing cap portion (14) and base (10) as illustrated in FIG. 2 are hollow and have semi-circular openings defined in opposing end walls through which a shaft (36) extends. More specifically, the cap portion has a semi-circular cutout (24) in one end wall (28) and the base portion (10) has a semi-circular opening (26) in a complementary end wall (32). The semi-circular openings (24) and (26) are aligned to define a generally circular opening at this end of the pillow block housing. The opposing end walls (30) and (34) of the cap portion (14) and base (10) respectively are likewise provided with a central opening designated by the reference numerals ($24^a$) and ($26^a$).

There is shown in FIGS. 2 and 4 a double row spherical bearing generally designated by the numeral (40), which rotatably supports the shaft (36) in the housing. The bearing (40) comprises the usual inner and outer rings (42) and (44) respectively and a complement of barrel shaped rollers (45) arranged in two rows in the annular space between the rings. The outer ring (44) seats in semi-circular recesses (48) and (50) in the cap portion (14) and base (10) respectively which are radially aligned to form a continuous circumferentially extending seat (51) for the outer ring (44) of the bearing. The width W of the seat (51) is preferably greater than the axial width $W_b$ of the bearing to accommodate bearings of different sizes and allow for thermal expansion of shaft (36). In the assembled relation, a stabilizing ring (56) engages in the seat (51) to locate the outer ring of the bearing in a fixed stable position in the bearing seat. The inner ring (42) of the bearing is mounted to the shaft by a wedge tapered sleeve (54) having an outer tapered surface ($54^a$). The tapered sleeve (54) is threaded at one axial end to accommodate a nut and lock washer (55) which presses the tapered bore ($42^a$) of inner ring (42) of the bearing against the taper to ($54^a$) clamp the inner bearing ring relative to the shaft. The inner ring (42) may be mounted directly to the shaft if desired. Lubricant ports (60) and (62) are provided in the cap portion (14) which are tapped to facilitate application of a grease fitting nozzle to supply a charge of grease to the interior pillow block housing and the bearing mounted therein. In circulating oil applications, the fittings (60) and (62) receive threaded oil inlet fittings to conduct oil lubricant to the bearing.

In accordance with the present invention, seal means is provided at opposite axial ends of the pillow block housing, the details of which are best shown in FIG. 3a. The seal arrangement in accordance with the present invention consists broadly of a labyrinth seal $S_l$, a O-ring seal $S_o$ and a lip seal characterized by a novel arrangement providing the functional advantages discussed above.

Thus the labyrinth seal $S_l$ comprises a triple ring member generally designated by the numeral (62) which is mounted on the shaft (36) and has circumferentially extending radially outwardly directed flanges (64) and (66) at opposing axial ends and an intermediate flange (68) of a shorter radial height $H_a$ than the radial height $H_b$ of the terminal end flanges (62) and (66). The flanges are axially spaced as illustrated to define circumferentially extending channels (70) and (72) between the end flanges and intermediate flange (68).

The inner end wall of the cap portion (14) is of a predetermined configuration complementing the flange and channel arrangement of the labyrinth seal member (62) to form a serpentine generally "W" shaped labyrinth path P between the members as shown in FIG. 3a. Thus, the end wall (28) has a pair of depending circumferentially extending ribs (74), (76) defining therebetween a circumferential channel (77) and are spaced apart a predetermined distance to engage in the grooves (70) and (72) formed in the labyrinth seal member (62). The ribs (74) and (76) are spaced axially inwardly from the inner and outer side surfaces ($28^a$) and ($28b$) of the end wall (28) to define land areas (81) and (83) overlying the flanges (64) and (66). The circumferentially extending space (77) between the ribs (74) and (76) straddles the intermediate flange (68) of the labyrinth seal member (62) and is of a radial depth $D_r$ to define with the intermediate flange (68) a rather substantial chamber (77) for a contact type sealing element (84) which has a body portion (86) filling the width of the chamber and a radially inwardly directed lip (88) projecting from one axial end of the body portion which engages the outer peripheral surface of the intermediate flange (68).

A circumferentially extending groove (91) is formed in the inner bore surface (93) of the sleeve member (62)

defining an annular chamber for an O-ring seal (90). The groove is aligned radially with the intermediate flange member (68) as shown in FIG. 3a.

The inner peripheral surface defining the semi-circular opening (26) in the base (10) is of a similar configuration to form with the labyrinth seal member (62) the same type of serpentine generally "W" shaped path P described above. Accordingly, the elements comprising the ribs and channels are given the same reference numerals with the subscript "b".

The lip seal (84) as shown in FIG. 2 faces outwardly and is adapted for grease lubricated bearings to facilitate purging. More specifically when it is desired to recharge the housing cavity with new grease, the fitting is simply applied to the housing part (60) and the pressure causes the sealing lip (88) to deflect outwardly and permit escape of the old grease when charging with the new and expel contaminants which have entered the labyrinth. The lip seal (88) may be reversed for retaining lubricant in the bearing housing when using oil type lubrication systems. FIG. 3b. shows reversal of the lip seal for applications where oil lubricant is used and the various referenced numerals applied previously are the same. Further, the O-ring seal (90) prevents passage of contaminants or lubricant under the ring seal and frictionally drives the ring seal to rotate at shaft speed.

Summarizing the above briefly and with reference to FIGS. 3a and 3b, the configuration in 3a is particularly adapted for grease lubrication applications and in this instance, the radially inwardly directed lip (88) presses against the seat ($68^a$) so that internal pressures deflect the lip (88) outwardly away from the seat ($68^a$) and create an opening for purging the grease when desired. More specifically, new grease entering the port (62) under pressure displaces the old grease causing an increased axial pressure on the outer peripheral face ($88^a$) of the lip (88) to produce the deflection action described. By contrast in FIG. 3b, the lip (88) is directed inwardly toward the interior of the bearing and therefore any lubricant pressure against the inner peripheral face (88b) of the lip, tends to seat the lip more firmly against the seat ($68^a$) and is used primarily in oil lubrication applications. In some instances where the shaft is vertically oriented, the FIG. 3b configuration is used in grease applications to prevent purging which may occur by gravitational forces on the grease lubricant.

The arrangement of the present invention provides advantages over press fit applications such as in the TESKE and TOOLY arrangements. Press fits typically require special or more precise machining and therefore add to the expense of manufacturing and assembling the components. The present invention also has an advantage over the prior art discussed above allowing for any needed axial movement of the shaft for example, due to thermal expansion and other forces in the system.

The O-ring seal $S_o$ has a sliding fit on the shaft. This eliminates wear of the parts and extends the life.

FIG. 4. shows a modified embodiment of the present invention which is useful in applications where the bearing is free to float to a limited degree in the bearing housing. This allows for a controlled axial play in the system. Similar parts are designated by the same reference numerals. In this instance, however, the shaft does not extend entirely through the housing and an end plate (97) in the nature of a disk with an O-ring seal (99) engages in a groove (101) between the flanges (74) and (76).

Even though particular embodiments of the present invention have been illustrated and described herein, it is not intended to limit the invention and changes and modifications maybe made therein within the scope of the following claims.

What is claimed is:

1. A pillow block assembly comprising,
   a hollow housing having axially spaced end walls,
   an opening in at least one end wall of said housing for a rotatable shaft member,
   a bearing in the housing to rotatably support the shaft member in the housing;
   a labyrinth seal member comprising an elongated sleeve member having an internal bore mounted on the shaft having a series of radially outwardly directed flanges including an intermediate flange, said flanges being axially spaced to define channels between the flanges and wherein the opening in said one end wall is of a cross section generally complementing the shape of the labyrinth seal to define a serpentine path therebetween, the space between the opening in said one end wall and intermediate flange being enlarged to define a chamber; and
   a resilient sealing member in said chamber engaging labyrinth seal member and housing.

2. A pillow block assembly as claimed in claim 1 including a second sealing member disposed between the said sleeve member and shaft.

3. A pillow block assembly as claimed in claim 1 wherein said elongated sleeve is a one piece member.

4. A pillow block assembly as claimed in claim 1 wherein the position of said sealing member in said chamber is selectively reversible to thereby provide a means for converting from a lubricant purging system to a lubricant retaining system.

5. A pillow block assembly comprising a hollow housing having axially spaced end walls, an opening in at least one end wall for a rotatable shaft member, a bearing in the housing to rotatably support the shaft member in the housing and seal means in the wall of the housing defining said opening including a labyrinth seal member mounted on the shaft, a first sealing member disposed between the labyrinth seal member and shaft and a second sealing member disposed between the labyrinth seal member and housing;
   said labyrinth seal comprising an elongated sleeve member mounted on the shaft having a series of radially outwardly directed flanges including an intermediate flange, said flanges being axially spaced to define channels between the flanges and wherein the opening in said one end wall is of a cross section generally complementing the shape of the labyrinth seal to define a serpentine path therebetween, the space between the opening in said one end wall and intermediate flange being enlarged to define a chamber for said second sealing member.

6. A pillow block assembly comprising a hollow housing having axially spaced end walls, an opening in at least one end wall for a rotatable shaft member, a bearing in the housing to rotatably support the shaft member in the housing and seal means in the wall of the housing defining said opening including a labyrinth seal member mounted on the shaft, a first sealing member disposed between the labyrinth seal member and shaft and a second sealing member disposed between the labyrinth seal member and housing;
   said labyrinth seal comprising an elongated sleeve member having an internal bore mounted on the shaft having a series of radially outwardly directed flanges including an intermediate flange, said flanges being axially spaced to define channels between the flanges and wherein the opening in said one end wall is of a cross section generally complementing the shape of the labyrinth seal to define a serpentine path therebetween, the space between the opening in said one end wall and intermediate flange being enlarged to define a chamber for said second sealing member; and means defining a circumferentially extending annular groove in the bore of the labyrinth seal member for said first sealing member.

7. A pillow block assembly comprising a hollow housing having axially spaced end walls, an opening in at least one end wall for a rotatable shaft member, a bearing in the housing to rotatably support the shaft member in the housing and seal means in the wall of the housing defining said opening including a labyrinth seal member mounted on the shaft, a first sealing member disposed between the labyrinth seal member and shaft and a second sealing member disposed between the labyrinth seal member and housing;

said labyrinth seal comprising an elongated sleeve member having an internal bore mounted on the shaft having a series of radially outwardly directed flanges including an intermediate flange, said flanges being axially spaced to define channels between the flanges and wherein the opening in said one end wall is of a cross section generally complementing the shape of the labyrinth seal to define a serpentine path therebetween, the space between the opening in said one end wall and intermediate flange being enlarged to define a chamber for said second sealing member;

means defining a circumferentially extending annular groove in the bore of the labyrinth seal member for said first sealing member; and said second sealing member comprising a contact seal having a body portion filling the width of the chamber and having a radially inwardly directed circumferentially extending lip at one axial end of the body portion which engages the intermediate flange member of said labyrinth seal member.

8. A pillow block assembly comprising a hollow housing having axially spaced end walls, an opening in at least one end wall for a rotatable shaft member, a bearing in the housing to rotatably support the shaft member in the housing and seal means in the wall of the housing defining said opening including a labyrinth seal member mounted on the shaft, a first sealing member disposed between the labyrinth seal member and shaft and a second sealing member disposed between the labyrinth seal member and housing;

said labyrinth seal comprising an elongated sleeve member having an internal bore mounted on the shaft having a series of radially outwardly directed flanges including an intermediate flange, said flanges being axially spaced to define channels between the flanges and wherein the opening in said one end wall is of a cross section generally complementing the shape of the labyrinth seal to define a serpentine path therebetween, the space between the opening in said one end wall and intermediate flange being enlarged to define a chamber for said second sealing member; and means defining a circumferentially extending annular groove in the bore of the labyrinth seal member for said first sealing member, said first sealing member comprising an O-ring seal engageable in said groove frictionally engaging the shaft whereby said labyrinth seal member rotates at generally the same speed as said shaft member.

9. A pillow block assembly comprising a hollow housing having axially spaced end walls, an opening in at least one end wall for a rotatable shaft member, a bearing in the housing to rotatably support the shaft member in the housing and seal means in the wall of the housing defining said opening including a labyrinth seal member mounted on the shaft, a first sealing member disposed between the labyrinth seal member and shaft and a second sealing member disposed between the labyrinth seal member and housing;

said labyrinth seal comprising an elongated sleeve member having an internal bore mounted on the shaft having a series of radially outwardly directed flanges including an intermediate flange, said flanges being axially spaced to define channels between the flanges and wherein the opening in said one end wall is of a cross section generally complementing the shape of the labyrinth seal to define a serpentine path therebetween, the space between the opening in said one end wall and intermediate flange being enlarged to define a chamber for said second sealing member;

the position of said second sealing member in said chamber being selectively reversible to thereby provide a means for converting from a lubricant purging system to a lubricant retaining system; and means defining a circumferentially extending annular groove in the bore of the labyrinth seal member for said first sealing member.

* * * * *